US011724394B2

(12) United States Patent
Wagner et al.

(10) Patent No.: US 11,724,394 B2
(45) Date of Patent: Aug. 15, 2023

(54) SYSTEMS AND METHODS FOR PROVIDING PROCESSING OF A VARIETY OF OBJECTS EMPLOYING MOTION PLANNING

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 17/528,955

(22) Filed: Nov. 17, 2021

(65) Prior Publication Data
US 2022/0072706 A1 Mar. 10, 2022

Related U.S. Application Data

(63) Continuation of application No. 16/505,500, filed on Jul. 8, 2019, now Pat. No. 11,213,949, which is a
(Continued)

(51) Int. Cl.
*B25J 9/16* (2006.01)
*B25J 9/00* (2006.01)
(Continued)

(52) U.S. Cl.
CPC ............. *B25J 9/1664* (2013.01); *B07C 3/008* (2013.01); *B25J 9/0093* (2013.01); *B25J 9/1694* (2013.01);
(Continued)

(58) Field of Classification Search
CPC ...... B25J 9/1664; B25J 9/0093; B25J 9/1694; B25J 9/1697; B25J 15/0616; B07C 3/008;
(Continued)

(56) References Cited

U.S. PATENT DOCUMENTS 4,704,694 A 11/1987 Czerniejewski
5,648,709 A * 7/1997 Maeda ................... G05B 17/02
700/262
(Continued)

FOREIGN PATENT DOCUMENTS

CA 2514204 A1 8/2004
CA 2928645 A1 4/2015
(Continued)

OTHER PUBLICATIONS

Examiner's Report issued by the Innovation, Sicence and Economic Development Canada (the Canadian Intellectual Property Office) in related Canadian Patent Application No. 3,117,170 dated Aug. 4, 2022, 6 pages.
(Continued)

*Primary Examiner* — Thomas Randazzo
(74) *Attorney, Agent, or Firm* — Gesmer Updegrove LLP

(57) ABSTRACT

A processing system is disclosed for providing processing of objects that includes a programmable motion device including an end effector, a perception system for recognizing any
(Continued)

of the identity, location, and orientation of an object presented in a plurality of objects at an input location, a grasp acquisition system for acquiring the object using the end effector to permit the object to be moved from the plurality of objects to one of a plurality of destination bins, and a motion planning system for determining a changing portion of a trajectory path of the end effector from the object to a base location proximate to the input location, and determining an unchanging portion of a trajectory path of the end effector from the base location to a destination bin location proximate to a destination bin.

29 Claims, 17 Drawing Sheets

Related U.S. Application Data continuation of application No. 15/427,359, filed on Feb. 8, 2017, now Pat. No. 10,350,755.

(60) Provisional application No. 62/292,538, filed on Feb. 8, 2016.

(51) Int. Cl.
*B25J 15/06* (2006.01)
*B07C 3/00* (2006.01)
*G05B 19/19* (2006.01)

(52) U.S. Cl.
CPC ......... *B25J 9/1697* (2013.01); *B25J 15/0616* (2013.01); *G05B 19/19* (2013.01); *G05B 2219/39102* (2013.01); *G05B 2219/40053* (2013.01); *G05B 2219/40078* (2013.01); *G05B 2219/40431* (2013.01); *G05B 2219/40519* (2013.01); *G05B 2219/45047* (2013.01); *G05B 2219/45063* (2013.01)

(58) Field of Classification Search
CPC .......... G05B 19/19; G05B 2219/39102; G05B 2219/40053; G05B 2219/40078; G05B 2219/40431; G05B 2219/40519; G05B 2219/45047; G05B 2219/45063
See application file for complete search history.

(56) References Cited

U.S. PATENT DOCUMENTS

| | | | |
|---|---|---|---|
| 5,764,013 A | 6/1998 | Yae | |
| 5,794,789 A | 8/1998 | Payson et al. | |
| 6,011,998 A | 1/2000 | Lichti et al. | |
| 6,015,174 A * | 1/2000 | Raes | B25J 15/0253 294/185 |
| 6,059,092 A | 5/2000 | Jerue et al. | |
| 6,721,444 B1 | 4/2004 | Gu et al. | |
| 7,313,464 B1 | 12/2007 | Perreault et al. | |
| 7,474,939 B2 | 1/2009 | Oda et al. | |
| 7,677,622 B2 | 3/2010 | Dunkmann et al. | |
| 8,070,203 B2 | 12/2011 | Schaumberger | |
| 8,718,814 B1 | 5/2014 | Clark et al. | |
| 8,874,270 B2 | 10/2014 | Ando | |
| 9,227,323 B1 | 1/2016 | Konolige et al. | |
| 9,259,844 B2 | 2/2016 | Xu et al. | |
| 9,266,237 B2 | 2/2016 | Nomura | |
| 9,283,680 B2 | 3/2016 | Yasuda et al. | |
| 9,486,926 B2 | 11/2016 | Kawano | |
| 9,492,923 B2 | 11/2016 | Wellman et al. | |
| 9,604,363 B2 | 3/2017 | Ban | |
| 9,846,926 B2 | 12/2017 | Hong et al. | |
| 2001/0045755 A1 | 11/2001 | Schick et al. | |
| 2001/0056313 A1 | 12/2001 | Osborne, Jr. | |
| 2002/0157919 A1 | 10/2002 | Sherwin | |
| 2003/0038491 A1 | 2/2003 | Schmalz et al. | |
| 2004/0122557 A1 | 6/2004 | Chandhoke | |
| 2006/0242785 A1 | 11/2006 | Cawley et al. | |
| 2007/0005179 A1 * | 1/2007 | Mccrackin | B25J 9/163 700/213 |
| 2007/0276539 A1 * | 11/2007 | Habibi | B25J 9/1612 700/245 |
| 2008/0046116 A1 | 2/2008 | Khan et al. | |
| 2008/0179224 A1 | 7/2008 | Van Bossuyt | |
| 2009/0019818 A1 | 1/2009 | Gilmore et al. | |
| 2010/0040450 A1 | 2/2010 | Parnell | |
| 2010/0094461 A1 | 4/2010 | Roth et al. | |
| 2010/0109360 A1 | 5/2010 | Meisho | |
| 2010/0125361 A1 | 5/2010 | Mougin et al. | |
| 2010/0180711 A1 | 7/2010 | Kilibarda et al. | |
| 2010/0217528 A1 | 8/2010 | Sato et al. | |
| 2010/0241260 A1 | 9/2010 | Kilibarda et al. | |
| 2010/0272347 A1 | 10/2010 | Rodnick et al. | |
| 2011/0184555 A1 * | 7/2011 | Kosuge | B25J 11/00 700/245 |
| 2013/0129464 A1 | 5/2013 | Regan et al. | |
| 2013/0166061 A1 | 6/2013 | Yamamoto | |
| 2013/0218335 A1 | 8/2013 | Barajas et al. | |
| 2013/0245824 A1 | 9/2013 | Barajas et al. | |
| 2013/0343640 A1 | 12/2013 | Buehler et al. | |
| 2014/0005831 A1 | 1/2014 | Naderer et al. | |
| 2014/0067121 A1 | 3/2014 | Brooks et al. | |
| 2014/0067127 A1 | 3/2014 | Gotou | |
| 2014/0088763 A1 * | 3/2014 | Hazan | B25J 9/1666 700/255 |
| 2014/0154036 A1 | 6/2014 | Mattern et al. | |
| 2014/0244026 A1 | 8/2014 | Neiser | |
| 2014/0305847 A1 | 10/2014 | Kudrus | |
| 2015/0057793 A1 | 2/2015 | Kawano | |
| 2015/0073589 A1 | 3/2015 | Khodl et al. | |
| 2015/0081090 A1 * | 3/2015 | Dong | B25J 13/08 700/230 |
| 2015/0100194 A1 * | 4/2015 | Terada | G05D 1/0214 701/25 |
| 2015/0203340 A1 | 7/2015 | Jacobsen et al. | |
| 2015/0224650 A1 | 8/2015 | Xu et al. | |
| 2015/0352717 A1 * | 12/2015 | Mundt | B25J 19/021 414/730 |
| 2015/0352721 A1 | 12/2015 | Wicks et al. | |
| 2015/0375398 A1 | 12/2015 | Penn et al. | |
| 2015/0375401 A1 | 12/2015 | Dunkmann et al. | |
| 2016/0075521 A1 | 3/2016 | Puchwein et al. | |
| 2016/0096694 A1 * | 4/2016 | Baylor | B65G 57/08 414/774 |
| 2016/0136816 A1 | 5/2016 | Pistorino | |
| 2016/0199884 A1 | 7/2016 | Lykkegaard et al. | |
| 2016/0221187 A1 | 8/2016 | Bradski et al. | |
| 2016/0243704 A1 * | 8/2016 | Vakanski | B25J 9/1664 |
| 2016/0297068 A1 * | 10/2016 | Thibodeau | G05B 19/408 |
| 2017/0021499 A1 | 1/2017 | Wellman et al. | |
| 2017/0036354 A1 | 2/2017 | Chavan Dafle et al. | |
| 2017/0050315 A1 | 2/2017 | Henry et al. | |
| 2017/0057091 A1 * | 3/2017 | Wagner | B25J 13/088 |
| 2017/0080566 A1 | 3/2017 | Stubbs et al. | |
| 2017/0080579 A1 | 3/2017 | Wagner et al. | |
| 2017/0087718 A1 | 3/2017 | Wagner et al. | |
| 2017/0106532 A1 | 4/2017 | Wellman et al. | |
| 2017/0120455 A1 | 5/2017 | Wagner et al. | |
| 2017/0136632 A1 | 5/2017 | Wagner et al. | |

FOREIGN PATENT DOCUMENTS

| | | |
|---|---|---|
| CA | 2985166 A1 | 12/2016 |
| CH | 701886 A2 | 3/2011 |
| DE | 3810989 A1 | 8/1989 |
| DE | 10121344 A1 | 11/2002 |
| DE | 102004013353 A1 | 10/2005 |
| DE | 102007023909 A1 | 11/2008 |
| DE | 102007028680 A1 | 12/2008 |
| DE | 102007038834 A1 | 2/2009 |
| DE | 102007054867 A1 | 5/2009 |
| DE | 102010002317 A1 | 8/2011 |
| DE | 102012003160 A1 | 9/2012 |

(56) References Cited

FOREIGN PATENT DOCUMENTS

| | | |
|---|---|---|
| DE | 102011115951 A1 | 4/2013 |
| DE | 102012102333 A1 | 9/2013 |
| EP | 0317020 A2 | 5/1989 |
| EP | 1671906 A1 | 6/2006 |
| EP | 2123407 A2 | 11/2009 |
| EP | 2181814 A1 | 5/2010 |
| EP | 2233400 A1 | 9/2010 |
| EP | 2256703 A1 | 12/2010 |
| EP | 2650237 A1 | 10/2013 |
| EP | 2937299 A1 | 10/2015 |
| EP | 2960024 A2 | 12/2015 |
| EP | 3006379 A2 | 4/2016 |
| EP | 3112295 A1 | 1/2017 |
| JP | H0769470 A | 3/1995 |
| JP | 2007182286 A | 7/2007 |
| WO | 2010034044 A2 | 4/2010 |
| WO | 2012127102 A1 | 9/2012 |
| WO | 2014064592 A2 | 5/2014 |
| WO | 2014161549 A1 | 10/2014 |
| WO | 2014166650 A1 | 10/2014 |
| WO | 2015035300 A1 | 3/2015 |
| WO | 2015118171 A1 | 8/2015 |
| WO | 2015162390 A1 | 10/2015 |
| WO | 2016100235 A1 | 6/2016 |
| WO | 2016198565 A1 | 12/2016 |
| WO | 2017044747 A1 | 3/2017 |
| WO | 2018017616 A1 | 1/2018 |

OTHER PUBLICATIONS

Extended European Search Report issued by the European Patent Office in related European Patent Application No. 21214193.1 dated Mar. 7, 2022, 12 pages.

International Preliminary Report on Patentability issued by the International Bureau of WIPO in related International Application No. PCT/US2017/016933, dated Aug. 14, 2018, 11 pages.

International Search Report and Written Opinion issued by the International Searching Authority in related International Application No. PCT/US2017/016933, dated Apr. 17, 2017, 13 pages.

Wikipedia, "Machine Vision", Wikipedia.org, Mar. 1, 2017 (https://en.wikipedia.org/w/index.php?title=Machine_vision&oldid=768036938).

Liu et al., "Hand-Arm Coordination for a Tomato Harvesting Robot Based on Commercial Manipulator," 2013 IEEE International Conference on Robotics and Biomimetics (ROBIO), Shenzhen China, IEEE, Dec. 12, 2013, pp. 2715-2720.

Vittor et al., "A Flexible Robotic Gripper for Automation of Assembly Tasks: A technology study on a gripper for operation in shared human environments," Assembly and Manufacturing (ISAM), 2011 IEEE International Symposium On, IEEE, May 25, 2011, pp. 1-6.

Moura et al., "Neural Network Based Perturbation Identification Approach for High Accuracy Tracking Control of Robotic Manipulators," Proceedings of the International Mechanical Engineering Congress and Exposition—IMECE—ASME, XX, XX, Nov. 1, 2003, pp. 1189-1197.

Hebert et al., "A Robotic Gripper System for Limp Material Manipulation: Hardware and Software Development and Integration," Proceedings of the 1997 IEEE International Conference on Robotics and Automation, Albuquerque, Apr. 20-27, 1997, Proceedings of the IEEE International Conference on.

Bohg, Jeannette et al., "Data-Driven Grasp Synthesis—A Survey," IEEE Transactions on Robotics, IEEE Service Center, Piscataway, NJ, US, vol. 30. No. 2, Apr. 1, 2014, pp. 289-309.

Cipolla, R. et al., "Visually guided grasping in unstructured environments," Robotics and Autonomous Systems, Elsevier Science Publishers, Amsterdam, NL, vol. 19, No. 3-4, Mar. 1, 1997, pp. 337-346.

Klingbeil et al., "Grasping with application to an autonomous checkout robot," Robotics and Automation (ICRA), 2011 IEEE International Conference on, IEEE, May 9, 2011, pp. 2837-2844.

Non-Final Office Action issued by the U.S. Patent and Trademark Office dated Aug. 30, 2017 in related U.S. Appl. No. 15/427,359, 30 pages.

Final Office Action issued by the U.S. Patent and Trademark Office dated Jun. 11, 2018 in related U.S. Appl. No. 15/427,359, 31 pages.

Non-Final Office Action issued by the U.S. Patent and Trademark Office dated Nov. 29, 2018 in related U.S. Appl. No. 15/427,359, 35 pages.

First Examiner's Report issued by the Canadian Intellectual Property Office dated Aug. 6, 2019 in related Canadian Patent Application No. 3,014,049, 5 pages.

Communication pursuant to Rule 161(2) and 162 EPC issued by the European Patent Office dated Sep. 19, 2018 in related European Patent Application No. 17750666.4, 3 pages.

Supplementary European Search Report issued by the European Patent Office dated Aug. 7, 2019 in related European Patent Application No. 17750666.4, 11 pages.

Examiner's Report issued by the Canadian Intellectual Property Office in related Canadian Patent Application No. 3,014,049 dated Apr. 9, 2020, 3 pages.

First Office Action issued by the National Intellectual Property Administration, P.R.C in related Chinese Patent Application No. 201780016848.5 dated Dec. 30, 2020, 20 pages.

Non-Final Office Action issued by the U.S. Patent and Trademark Office in related U.S. Appl. No. 16/408,065 dated Feb. 11, 2021, 31 pages.

Non-Final Office Action issued by the U.S. Patent and Trademark Office in related U.S. Appl. No. 16/505,500 dated May 14, 2021, 30 pages.

\* cited by examiner

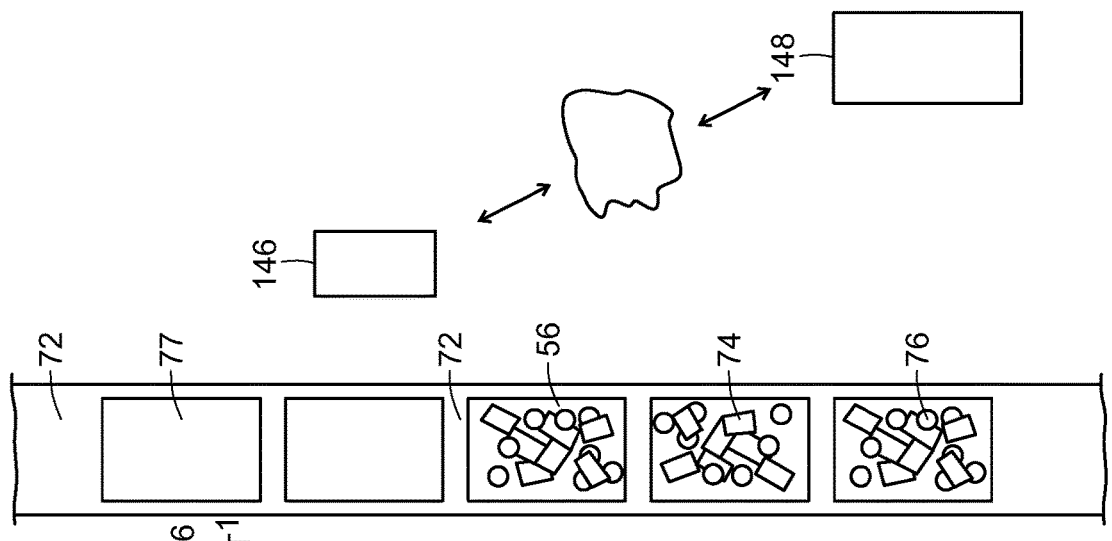
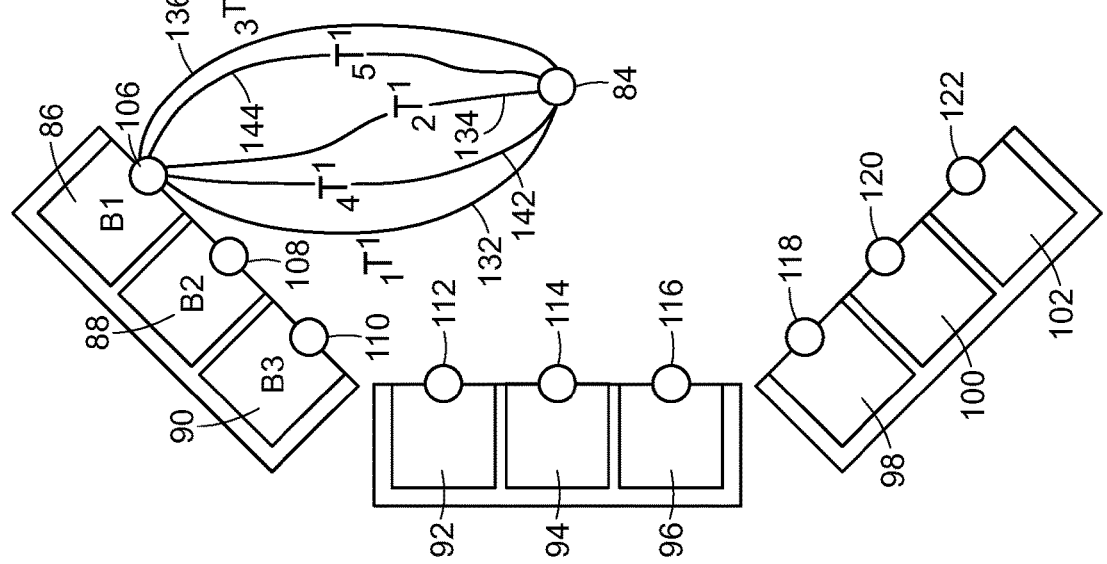
FIG. 5

SYSTEMS AND METHODS FOR PROVIDING PROCESSING OF A VARIETY OF OBJECTS EMPLOYING MOTION PLANNING

PRIORITY

The present application is a continuation application of U.S. patent application Ser. No. 16/505,500 filed Jul. 8, 2019, which is a continuation application of U.S. patent application Ser. No. 15/427,359 filed Feb. 8, 2017, now U.S. Pat. No. 10,350,755, issued Jul. 16, 2019, which claims priority to U.S. Provisional Patent Application Ser. No. 62/292,538 filed Feb. 8, 2016, the disclosures of which is hereby incorporated by reference in its entirety.

BACKGROUND

The invention generally relates to robotic and other sortation systems, and relates in particular to programmable motion control systems that are intended to be employed in changing environments requiring the motion control system to accommodate processing a variety of objects in both homogenous and heterogeneous arrangements.

Many order fulfillment operations achieve high efficiency by employing dynamic processes in which orders are picked from warehouse shelves and placed into bins that are sorted downstream. At the sorting stage individual articles are identified, and multi-article orders are consolidated into a single bin or shelf location so that they may be packed and then shipped to customers. The process of sorting these articles (or objects) has traditionally been done by hand. A human sorter picks an object from an incoming bin, finds the barcode on the object, scans the barcode with a handheld barcode scanner, determines from the scanned barcode the appropriate bin or shelf location for the object, and then places the object in the so-determined bin or shelf location where all objects for that order are placed.

Each object however, must be individually handled and processed, requiring that the programmable motion device accommodate a wide variety of objects of different sizes, shapes and weights. There remains a need therefore, for an object sortation and motion planning system for a programmable motion control system that is able to efficiently and effectively perform the automated sortation and handling of a variety of objects.

SUMMARY

In accordance with an embodiment, the invention provides a processing system for providing processing of homogenous and non-homogenous objects in both structured and cluttered environments. The processing system includes a programmable motion device including an end effector, a perception system for recognizing any of the identity, location, and orientation of an object presented in a plurality of objects at an input location, a grasp acquisition system for acquiring the object using the end effector to permit the object to be moved from the plurality of objects to one of a plurality of processing locations, and a motion planning system for determining a trajectory path from the input location to one of the plurality of processing locations. The trajectory path includes at least one changing portion that is determined specific to the object's location or orientation at the input location, and at least one unchanging portion that is generally used in determining trajectory paths for a plurality of objects.

In accordance with another embodiment, the invention provides a processing system for providing sortation of homogenous and non-homogenous objects in both structured and cluttered environments. The processing system includes a programmable motion device including an end effector, a perception system for recognizing any of the identity, location, and orientation of an object presented in a plurality of objects at an input location, a grasp acquisition system for acquiring the object using the end effector to permit the object to be moved from the plurality of objects to one of a plurality of processing locations, and a motion planning system for determining a trajectory path from the input location to one of the plurality of processing locations. The trajectory path includes at least one changing portion that is determined specific to the object's location or orientation at the input location, and at least one unchanging portion that is predetermined and is not specific to the object, the object's location or the object's orientation at the input area.

In accordance with a further embodiment, the invention provides a method of providing processing of homogenous and non-homogenous objects in both structured and cluttered environments. The method includes the steps of acquiring an object from an input location using an end effector of a programmable motion device to permit the object to be moved from the plurality of objects to one of a plurality of processing locations, and determining a trajectory path of the end effector from the object to one of the plurality of processing locations. The trajectory path includes at least one changing portion that is determined specific to the object's location or orientation at the input location, and at least one unchanging portion that is predetermined and is not specific to the object, the object's location or the object's orientation at the input area.

BRIEF DESCRIPTION OF THE DRAWINGS

The following description may be further understood with reference to the accompanying drawings in which:

FIG. 5 shows an illustrative diagrammatic view of the system of FIG. 3 showing additional possible trajectory paths as well as connectivity to through a network such as the Internet;

The drawings are shown for illustrative purposes only.

DETAILED DESCRIPTION

Systems of various embodiments of the invention, automate part of the sorting process in conjunction with a programmable motion control system (such as for example, a linear indexing pick and place system, a drone system, or any of a wide variety of robotic systems, including articulated arm robot systems, concentric tube robot systems, and parallel arm (Delta-type arm) robot systems). In particular, systems of various embodiments of the invention involve the steps of identifying and moving selected objects. A programmable motion control system picks an object from an input area, passes the object near a scanner, and then, having obtained identification information for the object (such as a barcode, QR codes SKU codes, other identification codes, information read from a label on the object, or size, weight and/or shape information), places the object in the appropriate location in accordance with a manifest.

In accordance with certain embodiments, the invention provides a novel motion planning system for the purposes of efficiently and effectively moving individual objects to a set of destination locations, e.g., sorting locations. In applications such as order fulfillment, objects (articles or goods etc.) are collected into heterogeneous sets and need to be sorted. Individual objects need to be identified and then routed to object-specific locations. In accordance with certain embodiments, the system reliably automates the movement of such objects by employing automated programmable motion (e.g., robotic) systems and motion planning.

Figure 1:
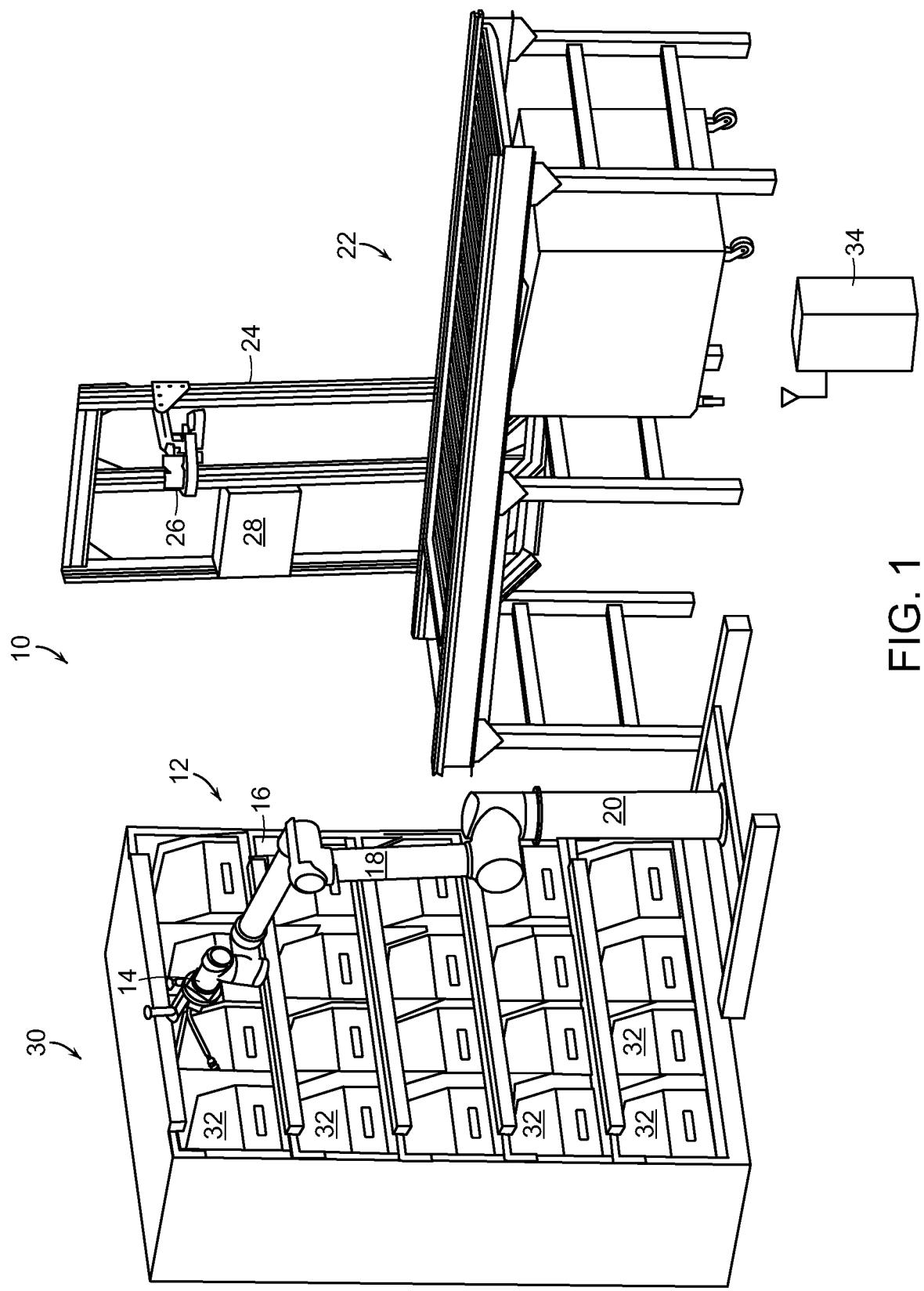
FIG. 1 shows an illustrative diagrammatic view of a system in accordance with an embodiment of the present invention.

Important components of an automated processing (e.g., robotic sortation) system in accordance with an embodiment of the present invention are disclosed with reference to FIG. 1. FIG. 1 shows a programmable motion system 10 (e.g., a robotic system) that includes an articulated arm 12 that includes an end effector 14 and articulated sections 16, 18 and 20. The articulated arm 12 selects objects from an input area such as a conveyor 22 that are either in an input bin on the conveyor 22 or are on the conveyor itself. A stand 24 includes an attached perception unit 26 that is directed toward the conveyor from above the conveyor. The perception unit 26 may be, for example, a 2D or 3D camera, or a scanner such as a laser reflectivity scanner or other type of bar-code reader, or a radio frequency ID scanner. An image display system is also provided as shown at 28 for providing an image of the perception unit's view on a touch screen input device. The robotic system 10 may further include the robotic environment and a target station 30 that includes a number of processing locations (e.g., sortation bins) 32 into which objects may be placed after identification. A central computing and control system 34 may communicate with the perception unit 26 and the image display system 28, as well as with the articulated arm 12 via wireless communication, or, in certain embodiments, the central computing and control system may be provided within the base section 20 of the articulated arm.

The system provides in an embodiment, an automated article identification system that includes a robotic pick and place system that is able to pick articles up, move them in space, and place them. The system may also include: the set of objects themselves to be identified, the manner in which inbound objects are organized (commonly in a heterogeneous pile in a bin or in a line on a conveyor), the manner in which outbound objects are organized (commonly in an array of outbound bins, or shelf cubbies), the manner in which objects are labeled with barcodes or radio-frequency identification tags, a fixed primary scanner operating above the incoming stream of objects, a scanning station where one or more scanners and illuminators are activated when the object is held at the station, and a central computing and control system determines the appropriate location for placing the object (which is dependent on the object's decoded barcode).

As noted, the robotic pick and place system may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic pick and place system. Their size, weight and geometry are assumed to be such that the robotic pick and place system is able to pick, move and place them. These may be any kind of ordered goods, packages, parcels, or other articles that benefit from automated sorting. Each object is associated with a universal product code (UPC) or other unique object identifier, which identifies the item or provides information (such as an address) that itself directs object processing.

As discussed above, the system of an embodiment includes a perception system 26 that is mounted above a bin of objects to be sorted, looking down into the bin. A combination of 2D and 3D (depth) data is acquired. The system uses this imagery and a variety of algorithms to generate a set of candidate grasp locations for the objects in the bin.

Figure 2:
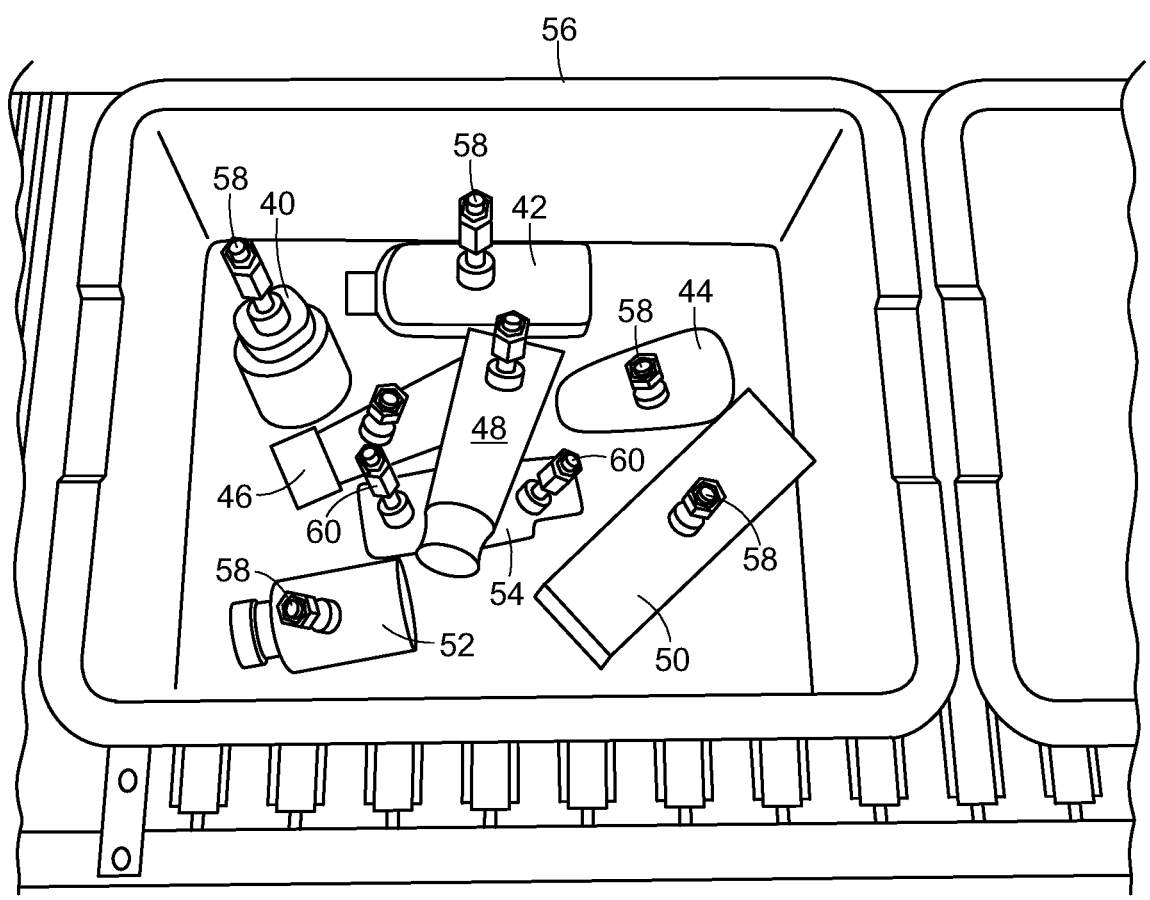
FIG. 2 shows an illustrative photographic view of an image captured by a perception device in the system as shown in FIG. 1.

FIG. 2 shows a diagrammatic image of a camera view from the perception unit 26, and the image may appear on the image display system 28 of FIG. 1 with superimposed images of an end effector seeking to grasp each object 40, 42, 44, 46, 48, 50, 52 and 54 in a bin 56, showing the location of each grasp. Candidate grasp locations 58 are indicated using a 3D model of the robot end effector placed in the location where the actual end effector would go to use as a grasp location as shown in FIG. 2. The image shows several grasp locations 58 that would be considered good (e.g., they are close to the center of mass of the object to provide greater stability during grasp and transport) and they avoid places on an object such as caps, seams etc. where a good vacuum seal might not be available. The image also shows two grasp locations 60 that are not good grasp locations, where the perception system did not correctly perceive the object 54, and in particular, did not perceive that another object 48 is lying on top of the object 54.

In accordance with various embodiments, the invention provides a programmable motion system that may learn object grasp locations from experience and human guidance. Most robotic systems, for example, designed to localize objects and pick them up, rely on a suite of sensors to give the system information about the location, size, pose, and even identity of an object. Such systems designed to work in the same environments as human workers will face an enormous variety of objects, poses, etc. The 2D/3D imagery in conjunction with the human-selected grasp points can be used as input to machine learning algorithms, to help the robotic system learn how to deal with such cases in the future, thereby reducing the need for operator assistance over time. A combination of 2D and 3D (depth) data is acquired, the system uses this imagery and a variety of algorithms to generate a set of candidate grasp points for the objects in the bin.

In addition to geometric information the system may learn the location of fiducial markers such as barcodes on the object, which can be used as indicator for a surface patch that is flat and impermeable, hence suitable for a suction cup. One such example is shipping boxes and bags, which tend to have the shipping label at the object's center of mass and provide an impermeable surface, as opposed to the raw bag material which might be slightly porous and hence not present a good grasp. In accordance with further examples, the fiducial marker itself may not be the target, but may provide a reference for finding a target grasp location. Once a product is identified and its orientation is known for example, a certain distance (e.g., x, y) from a fiducial marker may be used as an optimal grasp location.

The robotic system may employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

Figure 3:
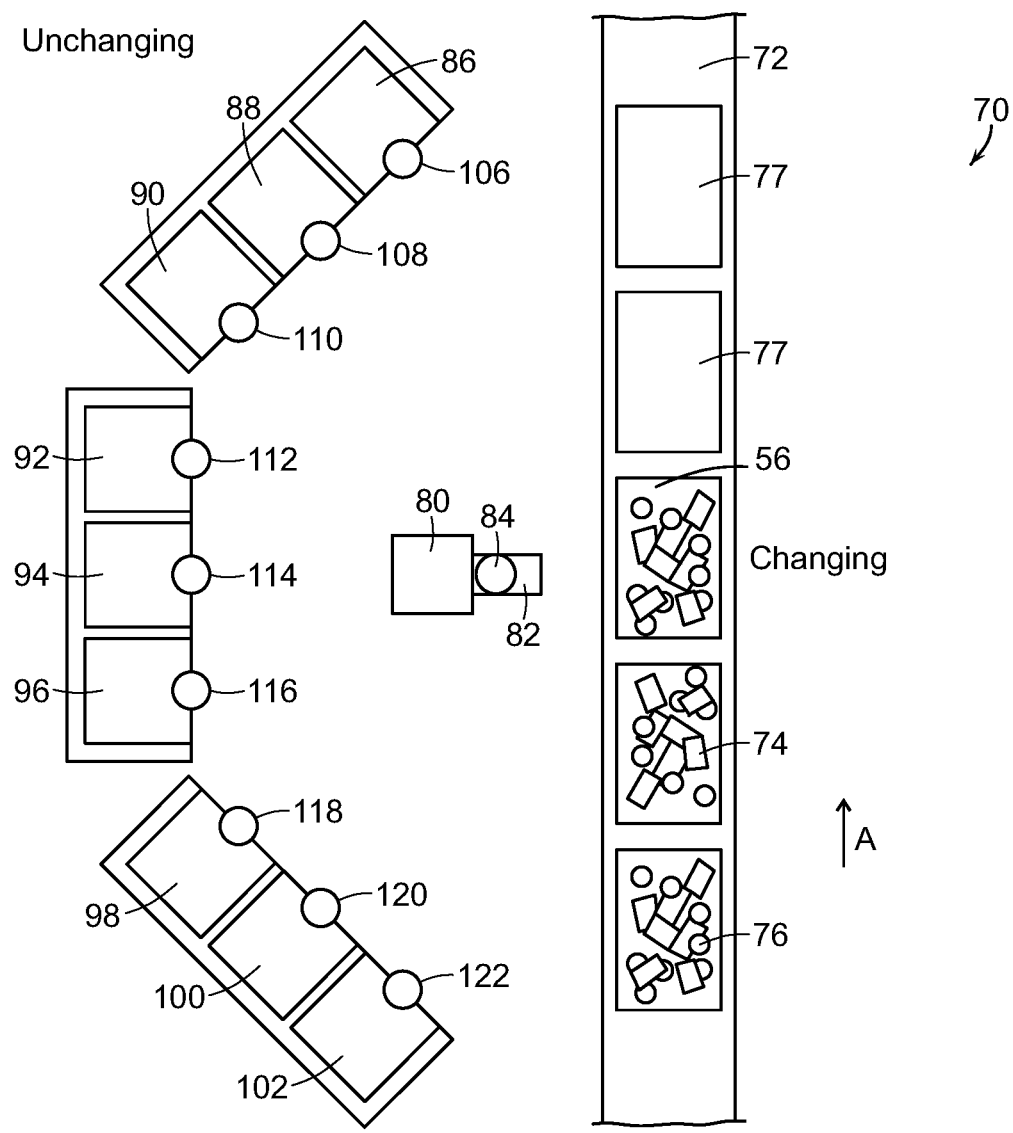
FIG. 3 shows an illustrative diagrammatic view of stations in an object processing system in accordance with an embodiment of the present invention.

FIG. 3 for example, shows a diagrammatic view of a robotic sortation system 70 that includes a conveyor 72 for providing input bins 56, 74, 76 along a direction as indicated at A to a sortation station. A robotic system is shown diagrammatically at 80 and includes an end effector 82 for moving objects from an input bin (e.g., 56) to processing locations, e.g., destination bins 86, 88, 90, 92, 94, 96, 98, 100, 102. Once emptied, the empty bins 77 continue on the conveyor 72.

The robotic system may include a defined home or base location 84 to which each object may initially be brought upon acquisition from the bin (e.g., 56). In certain embodiments, the system may include a plurality of base locations, as well as a plurality of predetermined path portions associated with the plurality of base locations. The trajectories taken by the articulated arm of the robot system from the input bin to the base location 84 are constantly changing based in part, on the location of each object in the input bin, the orientation of the object in the input bin, and the shape, weight and other physical properties of the object to be acquired.

Once the articulated arm has acquired an object and is positioned at the base location, the paths to each of the destination bins 86-102 are not changing. In particular, each destination bin 86-102 is associated with a unique destination bin location 106, 108, 110, 112, 114, 116, 118, 220, 222 and the trajectories from the base location 84 to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base location 84 and destination bin location 106.

Figure 4:
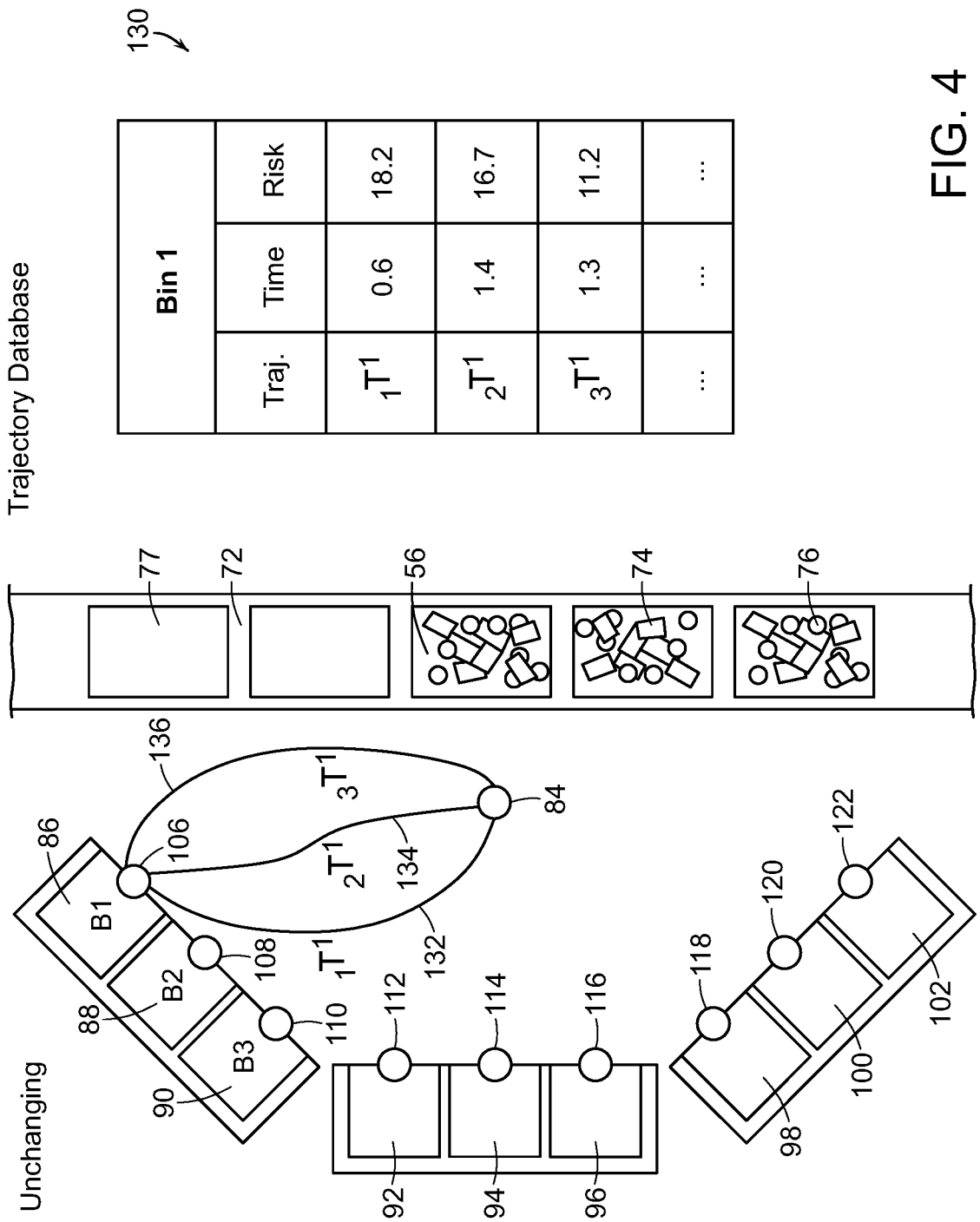
FIG. 4 shows an illustrative diagrammatic view of the system of FIG. 3 showing possible trajectory paths.

FIG. 4 for example, shows three such trajectories ($_1T^1$, $_2T^1$ and $_3T^1$) between base location 84 and the destination bin location 106. The elements of FIG. 4 are the same as those of FIG. 3. Each trajectory will have an associated time as well as an associated risk factor. The time is the time it takes for the articulated arm of the robotic system to accelerate from the base location 84 move toward the destination bin 86, and decelerate to the destination bin location 106 in order to place the object in the destination bin 86.

The risk factor may be determined in a number of ways including whether the trajectory includes a high (as predefined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 130 in FIG. 4, the trajectory $_1T^1$ (as shown at 132) from the base location 84 to the destination location 106 may have a fast time (0.6 s) but a high risk factor (18.2). The trajectory $_2T^1$ (as shown at 134) from the base location 84 to the destination location 106 may have a much slower time (1.4 s) but still a fairly high risk factor (16.7). The trajectory $_3T^1$ from the base location 84 to the destination location 106 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object.

FIG. 5 shows the three trajectories ($_1T^1$, $_2T^1$, $_3T^1$) to destination bin location 106 discussed with reference to FIG. 4, as well as two further trajectories ($_4T^1$, $_5T^1$) between base location 84 and the destination bin location 106. In the system of FIG. 5, the local control system 146 is able to communicate with one or more remote databases 148 via a network such as the Internet. The elements of FIG. 5 are the same as those of FIG. 4. Again, each trajectory will have an associated time as well as an associated risk factor. As shown in the table at 140 in FIG. 5, the trajectory $_4T^1$ (as shown at 142) from the base location 84 to the destination location 106 may have a fast time (0.4 s) and a moderate risk factor (13.2). The trajectory $_5T^1$ (as shown at 144) from the base location 84 to the destination location 106 may have a relatively fast time (1.1 s) and a very low risk factor (6.4).

Figure 6:
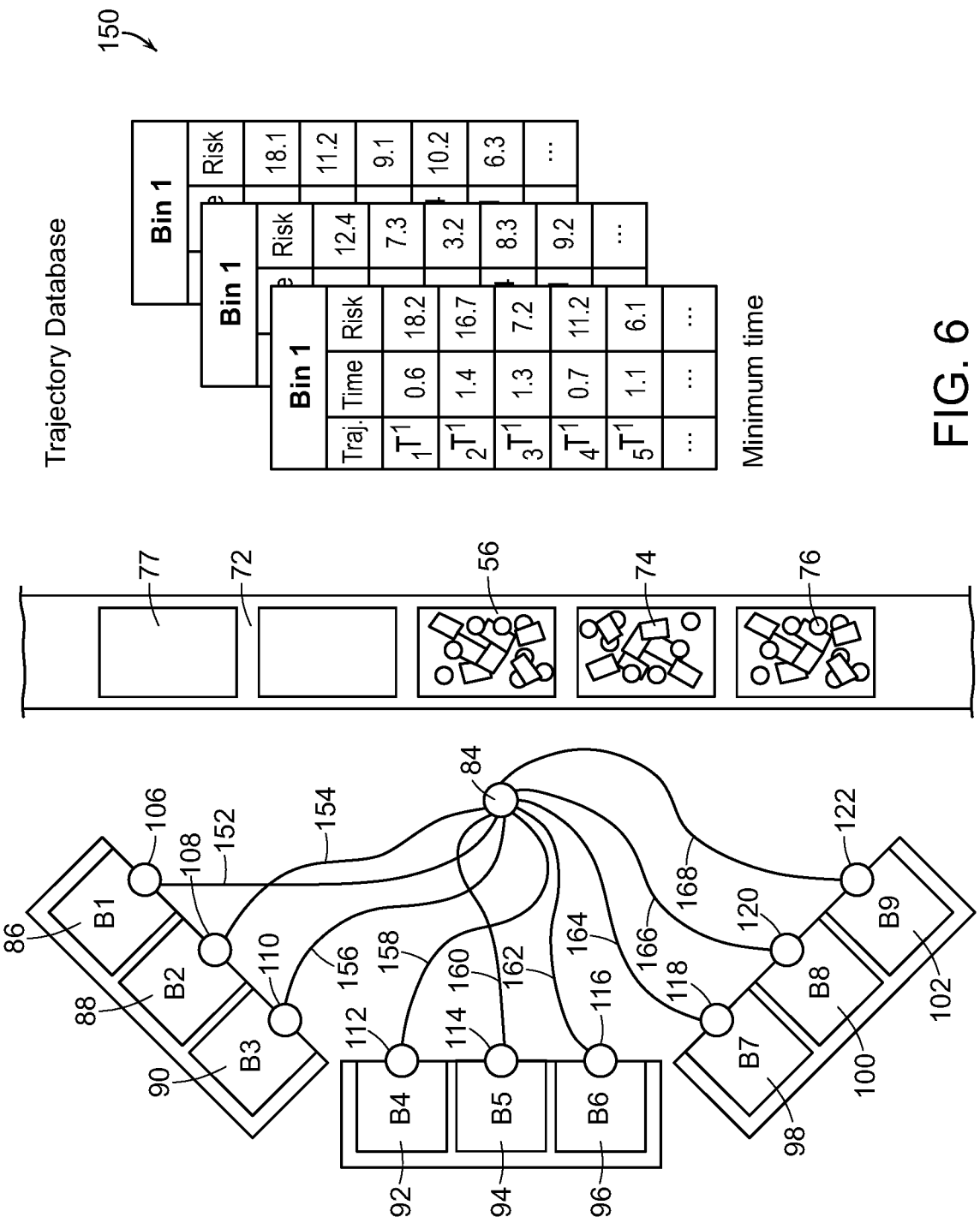
FIG. 6 shows an illustrative diagrammatic view of the system of FIG. 3 mapping trajectory paths for multiple sortation stations for achieving minimum time.

FIG. 6, for example, shows minimum time-selected trajectories from the base location 84 to each of the destination bin locations 106-122. In particular, the tables shown at 150 show the time and risk factors for a plurality of the destination bins (e.g., 1-3), and the trajectories from the base location 84 to each of the destination bin locations 106, 108 and 110 (as shown at 152, 154 and 156 respectively) are chosen to provide the minimum time for motion planning for motion planning under a risk factor of 14.0. Similarly, the trajectories from the base location 84 to each of the destination bin locations 112, 114 and 116 (as shown at 156, 158 and 160 respectively) are chosen to provide the minimum time for motion planning for motion planning under a risk factor of 14.0, and the trajectories from the base location 84 to each of the destination bin locations 118, 120 and 122 (as shown at 162, 164 and 166 respectively) are chosen to provide the minimum time for motion planning under a risk factor of 14.0.

Figure 7:
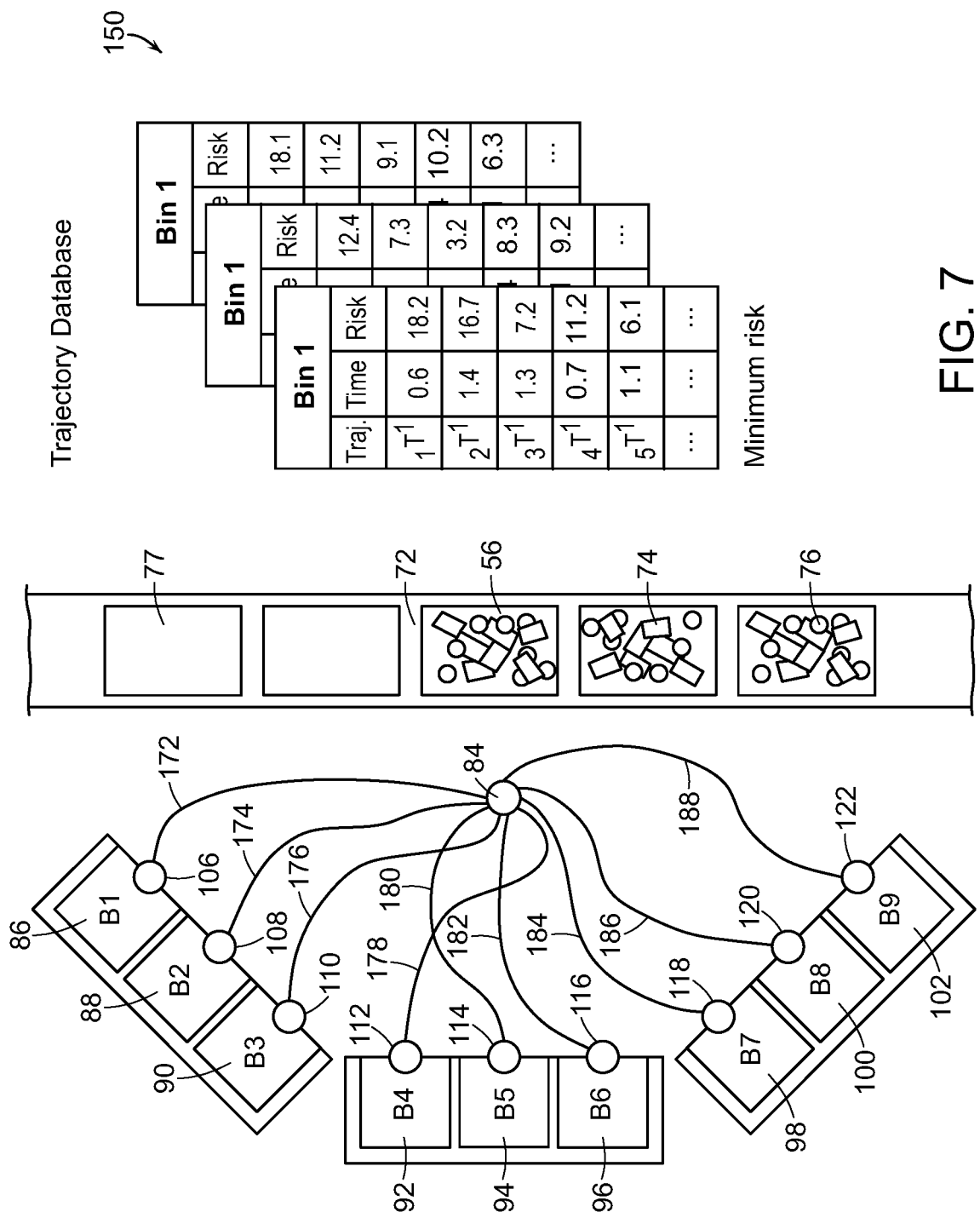
FIG. 7 shows an illustrative diagrammatic view of the system of FIG. 3 mapping trajectory paths for multiple sortation stations for achieving minimum risk.

FIG. 7 shows minimum risk-factor-selected set of trajectories from the base location 84 to each of the destination bin locations 106-122. Again, the tables shown at 150 show the time and risk factors for the plurality of the destination bins (e.g., 1-3). The trajectories from the base location 84 to each of the destination bin locations 106, 108 and 110 (as shown at 172, 174 and 176 respectively) are chosen to provide the minimum risk factor for motion planning for motion planning under a maximum time of 1.2 seconds. Similarly, the trajectories from the base location 84 to each of the destination bin locations 112, 114 and 116 (as shown at 176, 178 and 180 respectively) are chosen to provide the minimum risk factors for motion planning for motion planning under a maximum time of 1.2 seconds, and the trajectories from the base location 84 to each of the destination bin locations 118, 120 and 122 (as shown at 182, 184 and 186 respectively) are chosen to provide the minimum risk factors for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Further, in accordance with certain embodiments, the system of FIG. 7 may be used in the reverse order. In other words, the programmable motion system may be used to gather desired objects from the bins 86-102 and place them into combined sets or packages (break-packs) on a conveyor. Such break-packs may generally contain specific quantities of desired products for a variety of purposes. In such a system, the planned motion would be used when needed, but pre-planned trajectory portions that are pulled from a database would be used as much as possible to conserve computation time.

Figure 8:
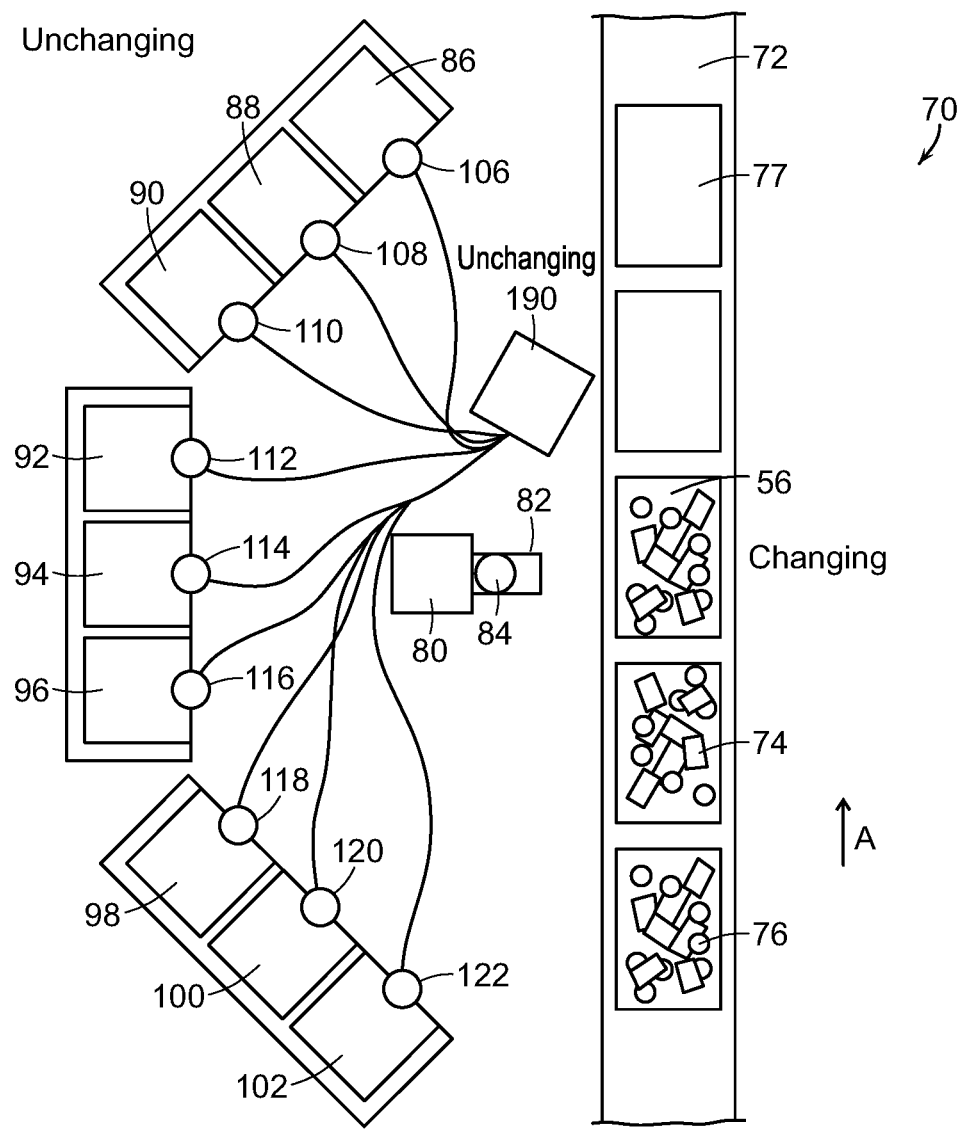
FIG. 8 shows an illustrative diagrammatic view of the system of FIG. 3 including an additional processing unit.

FIG. 8 shows a processing system similar to that of FIG. 7 except that the system of FIG. 8 includes an additional processing unit 190 such as a labelling machine. As products are selected from the bin (changing format), they may be brought to a first home position 84, and then moved to the processing unit 190. Once processed, the processing unit 190 then serves as a second home position, and unchanging paths from the processing unit 190 to the various bins may be chosen as discussed above.

Overall trajectories therefore, may include any number of changing and unchanging sections. For example. networks of unchanging trajectory portions may be employed as commonly used paths (roads), while changing portions may be directed to being objects to a close by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, each programmable movement system 80 may be provided with a plurality of home positions, and motion paths may be identified from each of the home positions in various embodiments. In accordance with further embodiments, multiple processing stations may be provided. In certain embodiments, therefore, a system may use the motion planning to plan a shorter overall distance by requiring that the system plan a path from the object grasp pose to a closest home position of several (e.g., a grid of) home positions.

Figure 9:
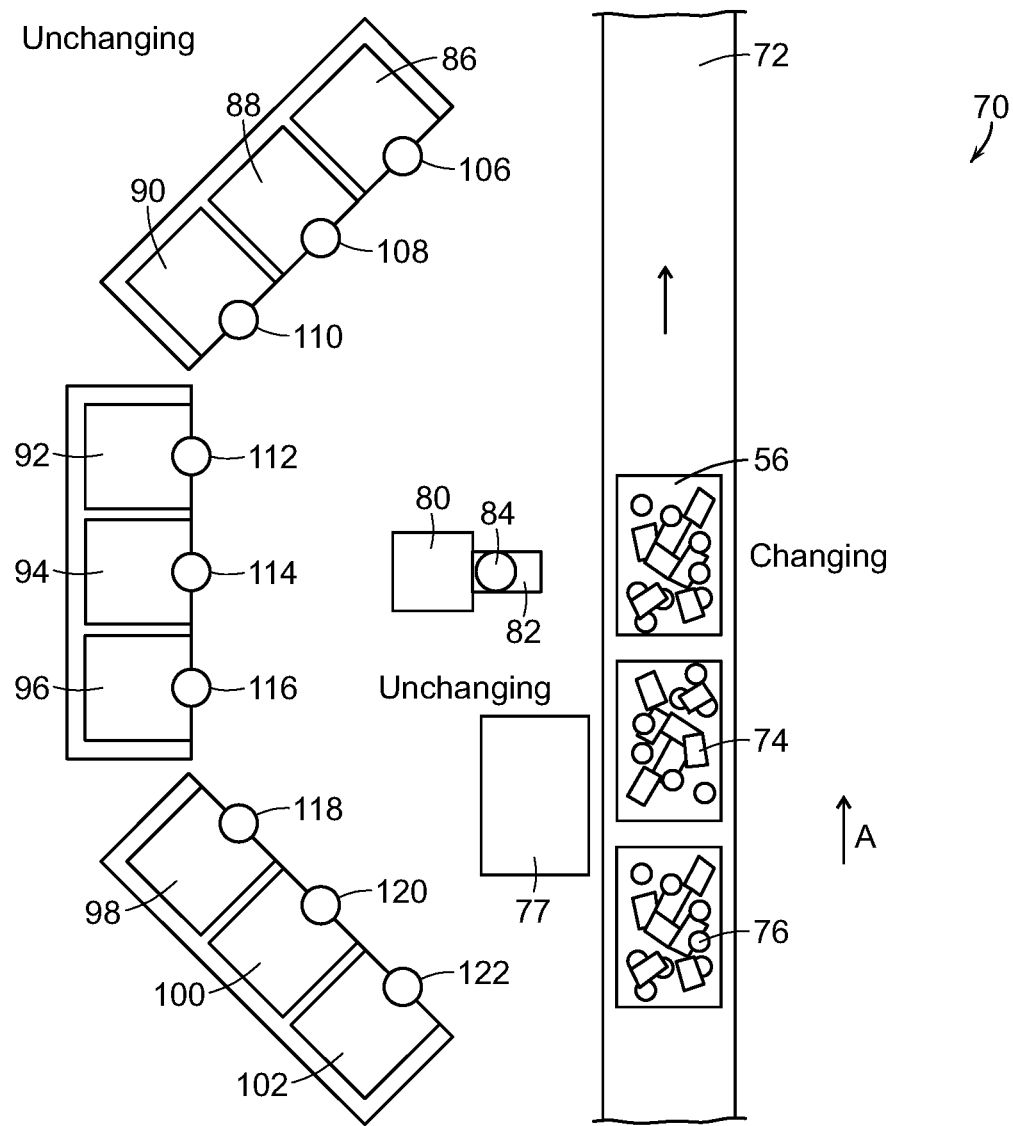
FIG. 9 shows an illustrative diagrammatic view of the system of FIG. 3 including bin removal motion planning.
Figure 10:
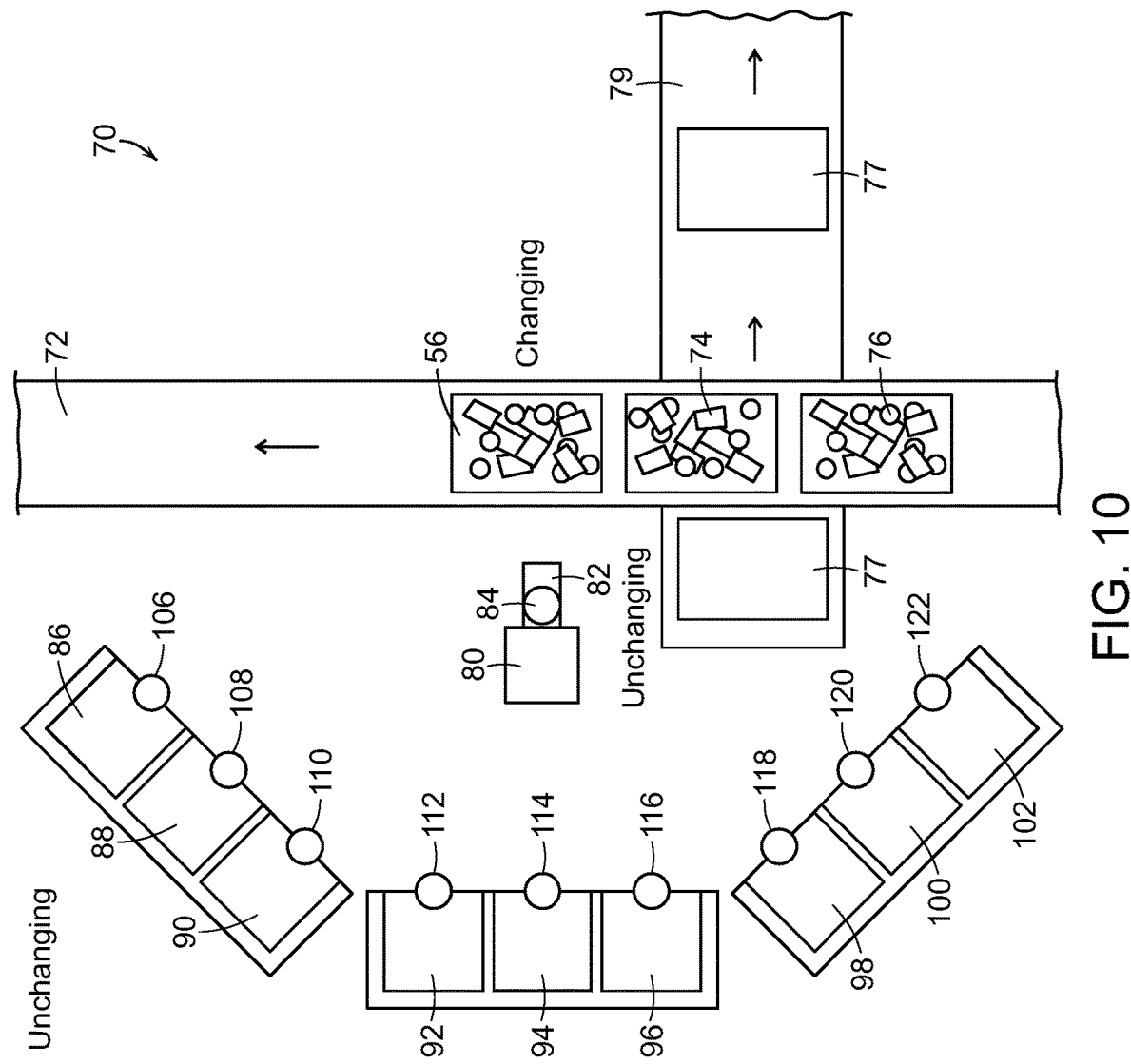
FIG. 10 shows an illustrative diagrammatic view of the system of FIG. 3 including bin removal motion planning and a conveyor for empty bins.

With reference to FIG. 9, the system may also provide that emptied bins 77 are removed from the conveyor 72 and stacked as shown, and with reference to FIG. 10, the system may instead place emptied bins 77 on a conveyor 79 that carries the empty bins away from the programmable motion device 80 as shown. In each of these further systems, the movement of the end effector of the programmable motion device in moving a bin, may also involve determining a trajectory path for the empty bin from the input location to the stacking location (FIG. 9) or to the empty bin conveyor 79 (FIG. 10). The trajectory path for the empty bin may include at least one changing portion that is determined specific to the bin's location or orientation at the input location, and at least one unchanging portion that is generally used in determining trajectory paths for a plurality of bins. In other words, the same type of motion planning may be employed in processing the emptied input bins 77.

Figure 11:
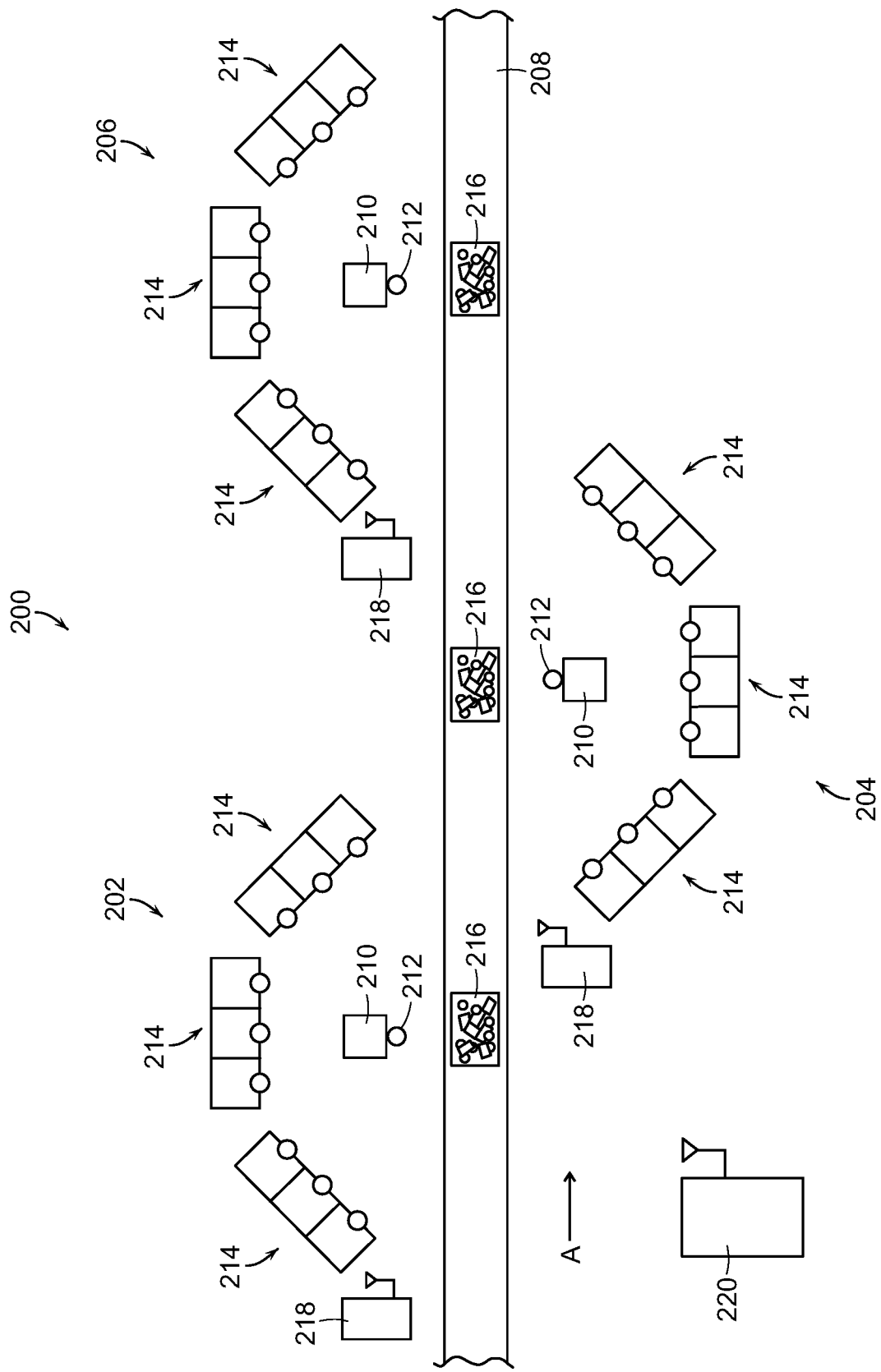
FIG. 11 shows an illustrative diagrammatic view of a system in accordance with a further embodiment of the present invention involving multiple processing stations.

FIG. 11 for example, shows a multi-stage robotic processing system 200 that include multiple robotic processing stations 202, 204, 206, each of which includes a robotic system 210 that acquires objects from a single input conveyor 208. Each robotic processing station 202, 204 206 includes a defined robotic system base location 212 and a plurality of destination bins 214 into which objects from input bins 216 may be placed. Each of the destination bins includes a defined destination bin location as discussed above, and each of the sortation systems also includes a local processor 218. Each of the local processors 218 communicates with a central processor 220 that includes a database to provide feedback and learning information regarding experiences in moving objects along different trajectories. As the database acquires more data points, the system should become more efficient and robust. By having all stations index into the same database or data sets therefore, different systems working in different places may have a common infrastructure for sharing information and planned trajectories.

Another advantage of the varied set is the ability to address several customer metrics without having to re-plan motions. The database is sorted and indexed by customer metrics like time, robustness, safety, distance to obstacles etc. and given a new customer metric, all the database needs to do is to reevaluate the metric on the existing trajectories, thereby resorting the list of trajectories, and automatically producing the best trajectory that satisfies the new customer metric without having to re-plan motions.

Another advantage is that even if they are invalid due to changes in the environment or customer metrics, these stored trajectories can serve as seeds for trajectory optimization algorithms, thereby speeding up the generation of new trajectories in new situations.

Figure 12:
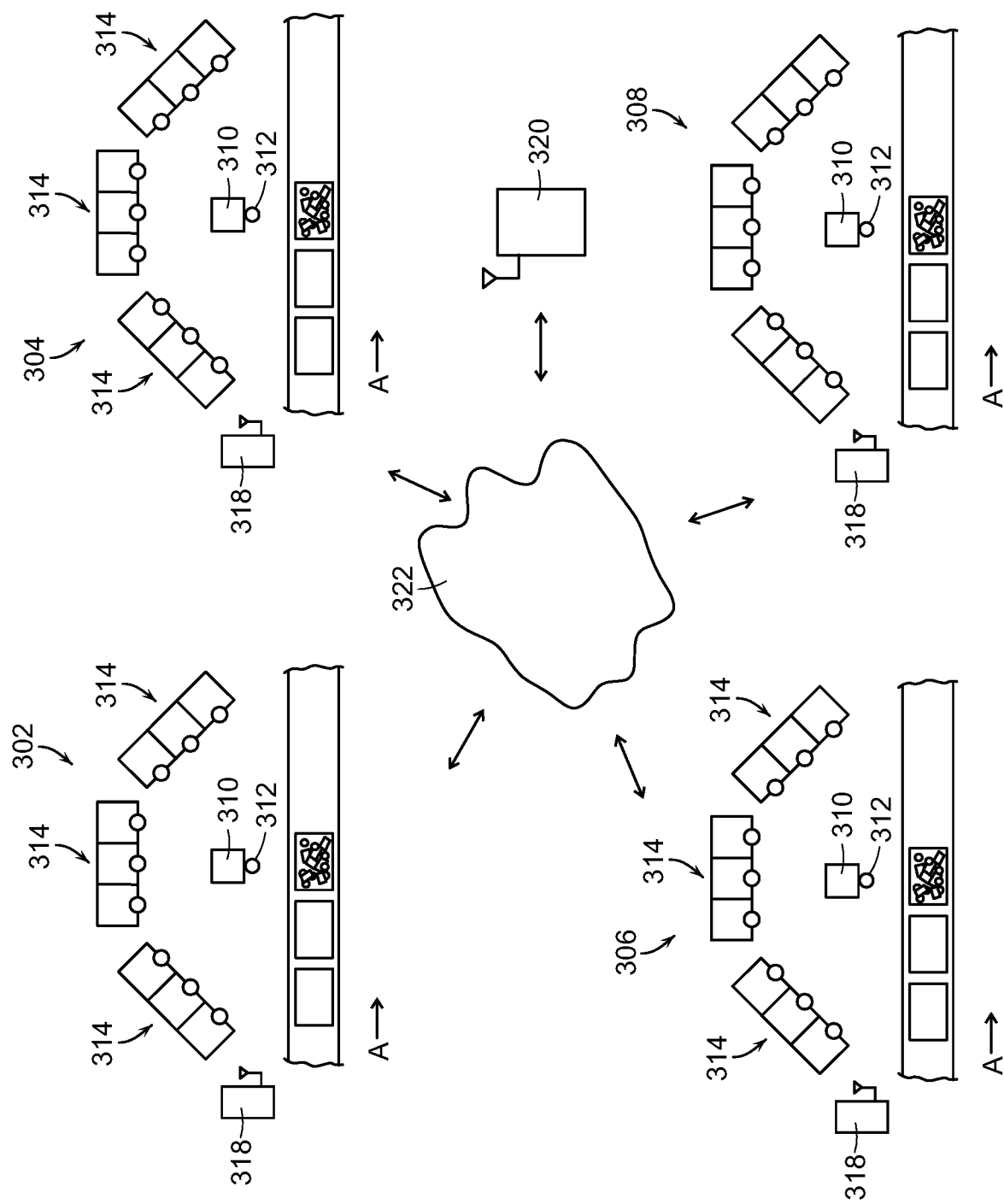
FIG. 12 shows an illustrative diagrammatic view of a system in accordance with a further embodiment of the present invention involving multiple processing stations that communicate via a network such as the Internet.

A further advantage is that the database offers a mechanism for different systems to share information remotely or over a network such as the Internet. FIG. 12 for example, shows a multi-stage robotic processing system 300 that include multiple robotic processing stations 302, 304, 306 and 308, each of which includes a robotic system 310 that acquires objects from an input conveyor. Each robotic processing station 302, 304, 306 and 308 includes a defined robotic system base location 312 and a plurality of destination bins 314 into which objects from input bins 316 may be placed. Each of the destination bins includes a defined destination bin location as discussed above, and each of the processing systems also includes a local processor 318. Each of the local processors 318 communicates with a central processor 320 that includes a database to provide feedback and learning information regarding experiences in moving objects along different trajectories. The robotic processing stations 302, 304, 306, 308 may be in remote locations and communicate with the central processor (and each other) via a wireless network such as the Internet 322. As the database acquires more data, the system should become more efficient and robust. By all indexing into the same database or data sets therefore, different systems working in different places may have a common infrastructure for sharing information and planned trajectories.

Figure 13:
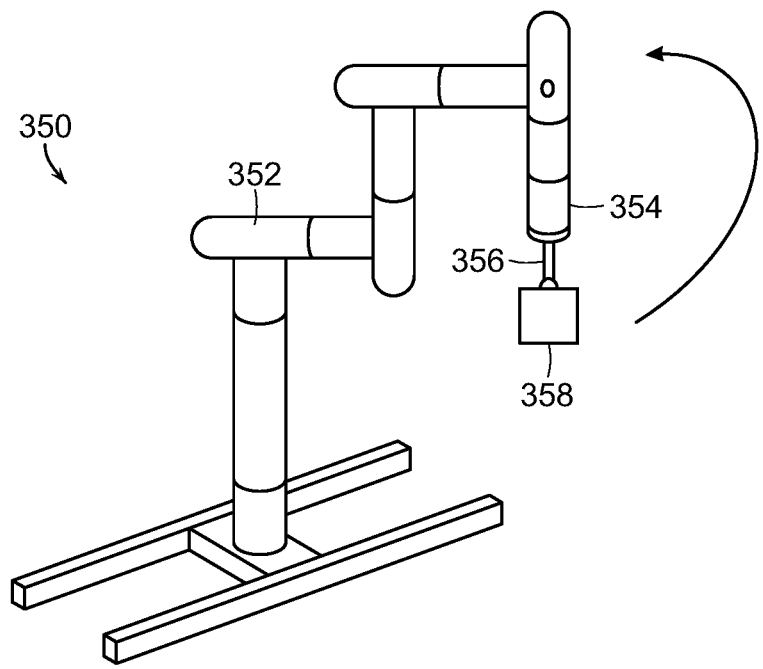
FIG. 13 shows an illustrative diagrammatic view of a robotic system employing motion planning in accordance with an embodiment of the present invention.
Figure 14A:
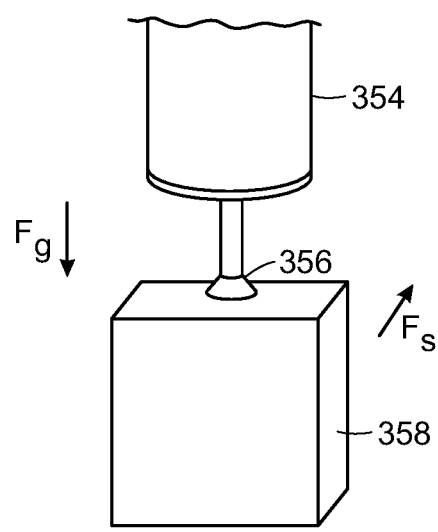
FIGS. 14A-14C show illustrative diagrammatic views of the end effector of FIG. 13 grasping and moving an object in accordance with an embodiment of the present invention.
Figure 14B:
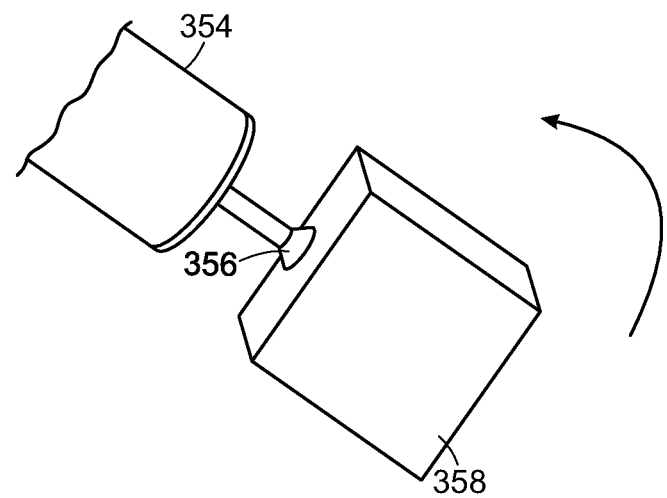
Figure 14C:
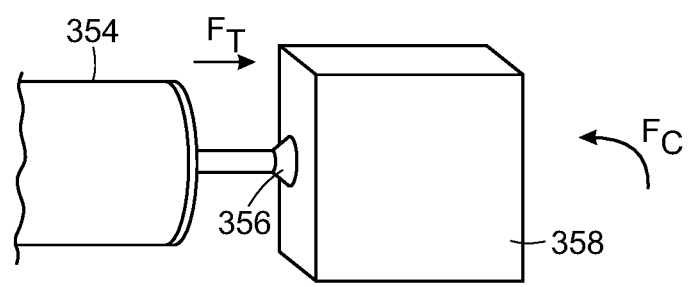

Motion planning systems of the invention may also be tailored to achieve further objectives such as reducing shear force between a gripper and an object, or moving an object that is open at the top. For example, FIG. 13 shows a programmable motion system 350, e.g., a robotic system, with an articulated arm 352 and an end effector 354 that includes a vacuum cup 356 for engaging objects 358. With reference to FIG. 14A, when the object 358 is lifted, a force of gravity ($F_g$) acts on the object, and if the object is moved rapidly in a direction that is transverse to the force of gravity, a sheer force ($F_s$) will act on the object with respect to the vacuum cup. A vacuum gripper may withstand a higher tensile force than a sheer force, and in an embodiment (and with reference to FIGS. 14B and 14C), the articulated arm may lift the object as it begins turning (FIG. 14B) such that when the object is rotated rapidly (FIG. 14C), a centrifugal force is applied at the end effector ($F_c$), maintaining the vacuum cup's grip on the object in tension ($F_t$). Such a system, for example, may be particularly well suited for applications in which the vacuum cup encounters heavy objects. Information therefore, regarding the size, shape and weight of an object (as well as its destination) may well also influence a chosen trajectory.

Figure 15:
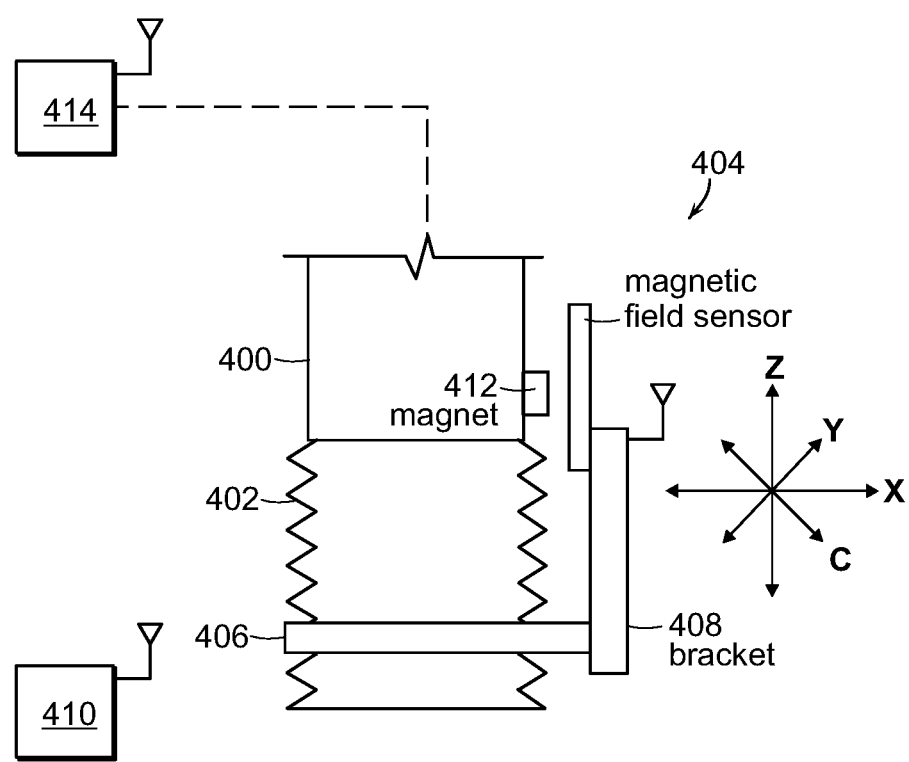
FIG. 15 shows an illustrative diagrammatic view of an end effector that includes feedback sensors for use in systems in accordance with certain embodiments of the present invention.

With reference to FIG. 15, in accordance with a further embodiment, the system may include an articulated arm 400 to which is attached an end effector 402 that may, for example, be a tubular or conical shaped bellows. The end effector 402 also includes a sensor 404 that includes an attachment band 406 on the bellows, as well as a bracket 408 attached to magnetic field sensor 404, and a magnet 412 is mounted on the articulated arm 400. As the bellows moves in any of three directions (e.g., toward and away from the articulated arm as shown diagrammatically at Z, in directions transverse to the direction Z as shown at X, and directions transverse to both the directions Z and X as shown at Y. The magnetic field sensor 404 may communicate (e.g., wirelessly) with a controller 410, which may also communicate with a flow monitor 414 to determine whether a high flow grasp of an object is sufficient for continued grasp and transport as discussed further below. In certain embodiment, for example, the system may return the object if the air flow is insufficient to carry the load, or may increase the air flow to safely maintain the load.

In certain embodiments, the end effector may be a tubular or conical shaped bellows. The magnetic field sensor may communicate (e.g., wirelessly) with a controller, which may also communicate with a flow monitor to determine whether a high flow grasp of an object is sufficient for continued grasp and transport as discussed further below. In certain embodiment, for example, the system may return the object if the air flow is insufficient to carry the load, or may increase the air flow to safely maintain the load.

Figure 16:
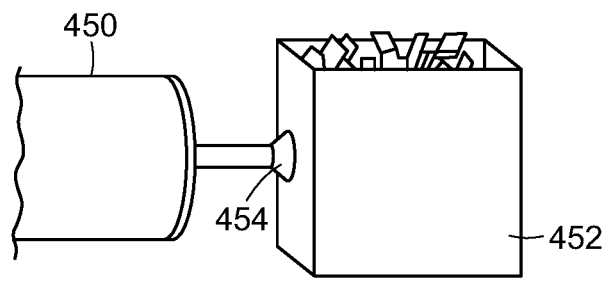
FIG. 16 shows an illustrative diagrammatic view of the end effector of FIG. 13 grasping an object in accordance with a further embodiment of the present invention.
Figure 17:
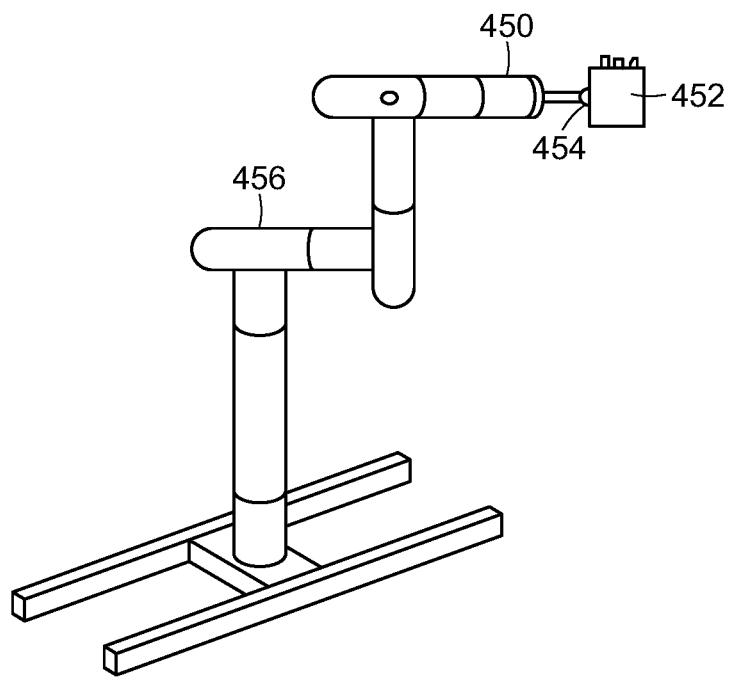
FIG. 17 shows an illustrative diagrammatic view of the end effector of FIG. 16 moving an object in accordance with a further embodiment of the present invention.
Figure 18:
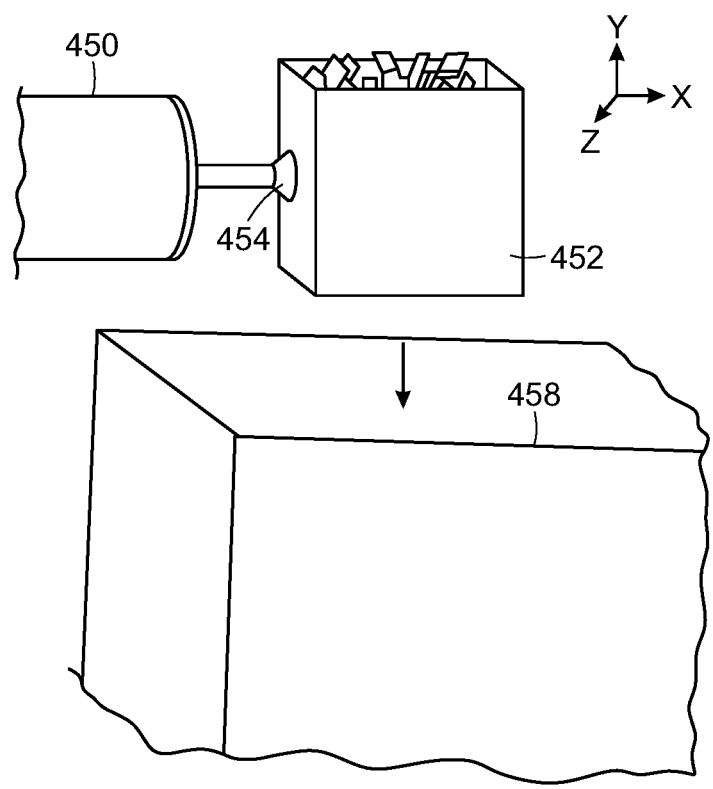
FIG. 18 shows an illustrative diagrammatic view of the end effector of FIG. 16 placing the object at a destination location in a desired orientation.

In accordance with further embodiments, systems of the invention may provide motion planning that accommodates specific needs or requirements, such that an opened container or box be moved without spilling the contents. For example, FIG. 16 shows an end effector 450 of a programmable motion device 456 that has engaged an open box 452 of items using a vacuum cup 454. As further shown in FIG. 17, as the programmable motion device moves the open box 452, the orientation with respect to the vertical axis is maintained, and as shown in FIG. 18, the programmable motion device may place the object 452 on a surface 458 at a processing location in a desired orientation.

Those skilled in the art will appreciate that numerous modifications and variations may be made to the above disclosed embodiments without departing from the spirit and scope of the present invention.

What is claimed is:

1. A method of processing objects, said method comprising:
    storing in a trajectory database a plurality of predetermined path sections for moving an end effector of an articulated arm between a base location and a destination location, the trajectory database further storing a predetermined risk factor and a predetermined time factor for each of the plurality of predetermined path sections;
    obtaining object pose information regarding an initial pose of an object presented at an input location;
    determining the destination location from among a plurality of destination locations based on the identification information obtained for the object;
    determining a grasp pose for grasping the object by the end effector;
    acquiring the object at the input location using the end effector using the grasp pose;
    selecting one of the plurality of predetermined path sections that satisfies at least one of a risk requirement and a time requirement;
    moving the acquired object along a trajectory path from the input location to the destination location via the base location using the end effector of the articulated arm, the trajectory path including the selected one of the plurality of predetermined path sections from the base location to the destination location; and
    placing the object at the destination location at the initial pose.

2. The method as claimed in claim 1, further comprising storing in the trajectory database a plurality of other predetermined path sections for moving the end effector of the articulated arm from the base location to other destination locations.

3. The method as claimed in claim 1, wherein the predetermined time factor stored in the trajectory database for each of the plurality of predetermined path sections includes a time required to move the end effector of the articulated arm from the base location to the destination location.

4. The method as claimed in claim 1, wherein the predetermined risk factor stored in the trajectory database for each of the plurality of predetermined path sections includes a likelihood of collision associated with the end effector of the articulated arm moving from the base location to the destination location.

5. The method as claimed in claim 1, wherein the selected one of the plurality of predetermined path sections from the base location to the destination location is determined to be a path with the associated shortest time required to move the end effector from the base location to the destination location and having a predetermined risk factor that is below a pre-defined maximum risk factor.

6. The method as claimed in claim 1, wherein the selected one of the plurality of predetermined path sections from the base location to the destination location is determined to be a path with the lowest risk factor associated with moving the end effector from the base location to the destination location and having a predetermined time factor that is below a pre-defined maximum time.

7. The method as claimed in claim 1, wherein at least one of the predetermined time factor and the predetermined risk factor for each of the plurality of predetermined path sections is provided by experience of the articulated arm and the end effector.

8. The method as claimed in claim 1, wherein at least one of the predetermined time factor and the predetermined risk factor for each of the plurality of predetermined path sections is provided by learned knowledge information from a plurality of articulated arms.

9. The method as claimed in claim 1, wherein the input location includes an input bin provided on an input conveyor.

10. A method of processing objects, said method comprising:
    storing in a trajectory database a plurality of predetermined path sections for moving an end effector of an articulated arm between a base location and a destination location, the trajectory database further storing a predetermined risk factor and a predetermined time factor for each of the plurality of predetermined path sections;
    obtaining object pose information regarding of an object presented at an input location, said object pose information including information regarding a required orientation with respect to a vertical axis;
    determining the destination location from among a plurality of destination locations based on the identification information obtained for the object;
    determining a grasp pose for grasping the object by the end effector;
    acquiring the object at the input location using the end effector using the grasp pose;
    selecting one of the plurality of predetermined path sections that satisfies at least one of a risk requirement and a time requirement; and
    moving the acquired object along a trajectory path from the input location to the destination location via the base location using the end effector of the articulated arm while maintaining the object pose including the orientation with respect to the vertical axis, the trajectory path including the selected one of the plurality of predetermined path sections from the base location to the destination location.

11. The method as claimed in claim 10, further comprising storing in the trajectory database a plurality of other predetermined path sections for moving the end effector of the articulated arm from the base location to other destination locations.

12. The method as claimed in claim 10, wherein the predetermined time factor stored in the trajectory database for each of the plurality of predetermined path sections includes a time required to move the end effector of the articulated arm from the base location to the destination location.

13. The method as claimed in claim 10, wherein the predetermined risk factor stored in the trajectory database for each of the plurality of predetermined path sections includes a likelihood of collision associated with the end effector of the articulated arm moving from the base location to the destination location.

14. The method as claimed in claim 10, wherein the selected one of the plurality of predetermined path sections from the base location to the destination location is determined to be a path with the associated shortest time required to move the end effector from the base location to the destination location and having a predetermined risk factor that is below a pre-defined maximum risk factor.

15. The method as claimed in claim 10, wherein the selected one of the plurality of predetermined path sections from the base location to the destination location is determined to be a path with the lowest risk factor associated with moving the end effector from the base location to the destination location and having a predetermined time factor that is below a pre-defined maximum time.

16. The method as claimed in claim 10, wherein at least one of the predetermined time factor and the predetermined risk factor for each of the plurality of predetermined path sections is provided by experience of the articulated arm and the end effector.

17. The method as claimed in claim 10, wherein at least one of the predetermined time factor and the predetermined risk factor for each of the plurality of predetermined path sections is provided by learned knowledge information from a plurality of articulated arms.

18. The method as claimed in claim 10, wherein the input location includes an input bin provided on an input conveyor.

19. A processing system comprising:
a perception unit that obtains object identification information for an object at an input location, the object identification information including pose information;
an articulated arm including an end effector configured to acquire the object based on the pose information, and move the object along a trajectory path from the input location, via a base location, to a target processing location determined from among a plurality of processing locations;
a motion planning system including a controller and a trajectory database, the trajectory database storing a plurality of predetermined path sections between the base location and the target processing location, the trajectory database further storing a predetermined risk factor and a predetermined time factor for each of the plurality of stored path sections, wherein the controller determines the target processing location based on the identification information for the object, including the pose information, provided by the perception unit, and wherein the controller determines at least a portion of the trajectory path between the base location and the target processing location; and
the target processing location including a destination surface on which the object is placed responsive to the pose information.

20. The processing system as claimed in claim 19, wherein the predetermined risk factor associated with the portion of the trajectory path between the base location and the target processing location is a minimum risk factor that is associated with a maximum time factor.

21. The processing system as claimed in claim 19, wherein the predetermined time factor associated with the portion of the trajectory path between the base location and the target processing location is a minimum time factor that is associated with a maximum risk factor.

22. The processing system as claimed in claim 19, wherein the trajectory path includes at least one portion that is determined by the controller based on at least one of a location and orientation of the object at the input location.

23. The processing system as claimed in claim 19, wherein at least one portion of the trajectory path is determined by the controller further responsive to trajectory data that includes experience of the articulated arm including the end effector.

24. The processing system as claimed in claim 19, wherein at least one portion of the trajectory path is determined by the controller further responsive to trajectory data that includes learned knowledge information from a plurality of articulated arms.

25. The processing system as claimed in claim 19, wherein the processing system further includes at least one sensor for monitoring object acquisition characteristics during object acquisition and during travel.

26. The processing system as claimed in claim 19, wherein the controller is adapted to reverse the trajectory path.

27. The processing system as claimed in claim 19, wherein the controller is further configured for increasing air flow at the end effector.

28. The processing system as claimed in claim 19, further comprises a plurality of articulated arms, each of the plurality of articulated arms including a respective end effector configured to acquire and move objects along trajectory paths that include at least one changing portion and at least one unchanging portion.

29. The processing system as claimed in claim 28, wherein each articulated arm is associated with an input area that includes at least one input conveyor that is common to all input areas.

\* \* \* \* \*

UNITED STATES PATENT AND TRADEMARK OFFICE
CERTIFICATE OF CORRECTION

PATENT NO. : 11,724,394 B2
APPLICATION NO. : 17/528955
DATED : August 15, 2023
INVENTOR(S) : Thomas Wagner et al.

It is certified that error appears in the above-identified patent and that said Letters Patent is hereby corrected as shown below:

In the Specification

In the Priority section, Column 1, Line 9, should read:
"2019, now U.S. Pat. No. 11,213,949, issued Jan. 4, 2022, which is a continuation application of U.S. patent application"

In the Priority section, Column 1, Lines 14-15, should read:
"62/292,538 filed Feb. 8, 2016, the disclosures of which are hereby incorporated by reference in their entireties."

In Column 2, Line 53, should read:
"paths as well as connectivity through a network such as"

In Column 9, Line 14, should read:
"essing system 200 that includes multiple robotic processing"

In Column 10, Line 41, should read:
"at Y). The magnetic field sensor 404 may communicate (e.g.,"

Signed and Sealed this
Fifth Day of March, 2024

Katherine Kelly Vidal
*Director of the United States Patent and Trademark Office*